US006588085B2

(12) United States Patent
Holloway

(10) Patent No.: US 6,588,085 B2
(45) Date of Patent: Jul. 8, 2003

(54) METHOD OF MANUFACTURING ANODIZED METAL COSMETIC CASES WITH CONTRASTING BRIGHT AND TEXTURED SURFACES

(75) Inventor: Thomas F. Holloway, Southbury, CT (US)

(73) Assignee: Crown Cork & Seal Technologies Corporation, Alsip, IL (US)

( * ) Notice: Subject to any disclaimer, the term of this patent is extended or adjusted under 35 U.S.C. 154(b) by 35 days.

(21) Appl. No.: 10/013,424

(22) Filed: Dec. 10, 2001

(65) Prior Publication Data

US 2003/0106201 A1 Jun. 12, 2003

(51) Int. Cl.[7] .................................................. B23P 17/00

(52) U.S. Cl. ..................... 29/527.4; 29/527.2; 205/202; 427/287

(58) Field of Search ............................ 29/527.2, 527.4; 205/198, 202; 427/287

(56) References Cited

U.S. PATENT DOCUMENTS 3,634,086 A * 1/1972 Lawson et al.

2002/0123004 A1 * 9/2002 Fromson et al.

FOREIGN PATENT DOCUMENTS

JP 8-256832 * 10/1996

* cited by examiner

*Primary Examiner*—P. W. Echols

(74) *Attorney, Agent, or Firm*—St. Onge Steward Johnston & Reens LLC

(57) ABSTRACT

A method for manufacture of a metal cosmetic case having contrasting bright areas and duller textured areas, comprising the steps of: fabricating a cosmetic case from aluminum alloy; including polishing the cosmetic case and applying a surface texture to portions of the cosmetic case to form textured portions thereon; anodizing the cosmetic case to provide a bright shine to at least the outer surface of the cosmetic case; and printing over the textured portions with an ink to provide the textured portions with a contrasting finish to the bright shine of the outer surface of the cosmetic case.

19 Claims, 1 Drawing Sheet

METHOD OF MANUFACTURING ANODIZED METAL COSMETIC CASES WITH CONTRASTING BRIGHT AND TEXTURED SURFACES

FIELD OF THE INVENTION

The present invention relates to manufacturing methods used to provide desired surface finishes to anodized metal cosmetic cases.

BACKGROUND OF THE INVENTION

The cosmetic industry serves a range of markets, from young teenagers to older, more mature customers. In the more upscale markets it is desirable for the cosmetic packaging to project elegance and sophistication, particularly where the product is priced at a relatively high price point. Historically, silver plated packaging has been used to provide the appearance of elegance in many applications such as lipstick cases or caps, and compacts. In such packaging, the case has been manufactured from brass; the case is then polished, and texture is applied to raised areas in the case. For example, a lipstick cap may be formed having a series of alternating horizontal bands and channels along the height of the case, and a finely textured series of ridges can be applied; to the outer surfaces of the horizontal bands. The product is then silver plated and lacquered. The resulting product has an elegant appearance, with a contrast between the brighter silver plate in the channels, and the duller silver plate on the textured bands. The difference in appearance is due to the thinness of the silver plate and/or the capture of the lacquer in the textured areas.

Recently, in an effort to provide a lower cost alternative to silver plated cosmetic cases, a number of products have been developed that emulate the brightness of silver plate, but which use lower cost components. For example, lipstick cases have been fabricated from aluminum, and they have been anodized with a silver tinted finish. These products provide an attractive bright silver look to the cosmetic case. However, this substitute process is not usable where a contrast is desired between a smooth metal area and a textured metal area. This is because the anodizing process provides a product with a uniform brightness; in other words, both the smooth metal and the textured metal are equally shiny. Unlike in conventional silver plating processes where the smooth metal is bright and shiny, and the textured metal has a duller shine, the anodized product is very bright and shiny over its entire surface.

It would be desirable to provide a method for fabrication of anodized metal components to provide a brightness contrast between smooth metal areas and textured metal areas.

SUMMARY OF THE INVENTION

The present invention provides a method for manufacture of a cosmetic case, comprising the steps of: fabricating a cosmetic case from aluminum alloy; including polishing the cosmetic case and applying a surface texture to portions of the cosmetic case to form textured portions thereon; anodizing the cosmetic case to provide a bright shine to at least the outer surface of the cosmetic case; and printing over the textured portions with an ink to provide the textured portions with a contrasting finish to the bright shine of the outer surface of the cosmetic case. The ink is preferably a translucent matte ink.

In the preferred embodiment, the cosmetic case comprises a cap for a lipstick dispenser; most preferably the cap's outer surface is provided with smooth channels alternating with textured bands.

Other objects, aspects and features of the present invention in addition to those mentioned above will be pointed out in or will be understood from the following detailed description provided in conjunction with the accompanying drawings.

DETAILED DESCRIPTION OF THE DRAWINGS

Figure 1:
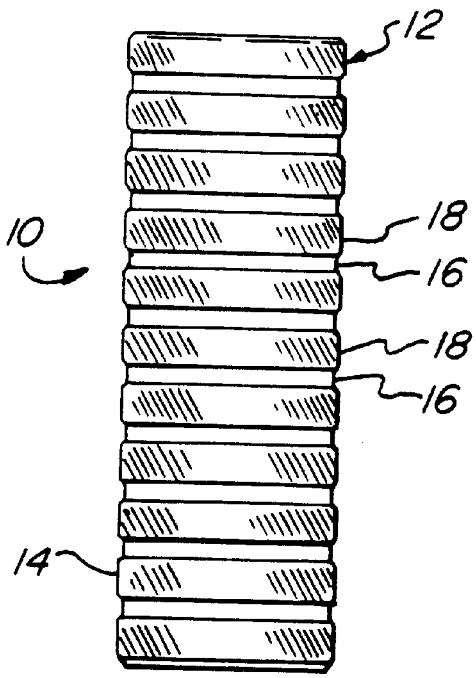
FIG. 1 is a side elevation view of an embodiment of a cosmetic case made in accordance with the methods of the present invention.

Anodizing is a process for finishing aluminum alloys in which electrolytic oxidation of the aluminum surface produces a protective oxide coating. A preferred aluminum alloy for anodizing is Alloy 6063; for a special anodized finish such as “bright dip,” alloy 6463 is preferable. The oxide coating consists of hydrated aluminum oxide and is resistant to corrosion and abrasion. Conventional coatings are 0.1 to 1.0 mil thick and are essentially transparent, although they may be colored. Anodizing takes place by immersing the work in a series of solutions where various process steps occur.

A typical anodizing process line may include cleaning, pre-treating, anodizing, and sealing steps. The solutions are held in open tanks and racks of the products to be processed are moved sequentially from one tank to another. Overhead cranes are used to move the racks from one tank to the next. The products are rinsed thoroughly after each operation to avoid contamination and interference in the next solution.

Cleaning is generally accomplished by soaking the product for several minutes in a water-based solution containing mild acids or alkalies along with dispersants and detergents. These cleaners remove fabrication oils and buffing compounds.

Pretreatment is used for decorative purposes—to improve the appearance of a surface prior to the anodizing step. In the present method the pretreatment may include polishing step, or the polishing can be omitted. The polishing step will be a mechanical polishing using a polishing compound and/or it may be a chemical polishing using a “bright dip” process. The bright dip process takes place in a bath of a special dip solution made of hot phosphoric acid and nitric acids. The resulting finish is smooth, bright and shiny, because the aluminum surface of the product dissolves so as to level out the microscopic peaks and valleys. Another possible pretreatment is an etch process. Etch can be accomplished by dipping the products in a solution of caustic soda (sodium hydroxide). The etch imparts a satin, matte finish by dissolving aluminum from the surface in a microscopically irregular pattern. After etch or bright dip, it is a common practice to dip the metal in an acidic desmut/deoxidizer solution to remove any residue of alloying agents or oxides.

Anodizing is the step which produces the actual coating. It is accomplished in an electrolytic cell using sulfuric acid as the electrolyte. One possible electrolyte is a mixture of sulfuric and sulfosalicylic acids in a concentration range of from about 1 to 4 gm/l $H_2SO_4$ and from about 50 to 120 gm/l $C_7H_6O_6S$. Anodizing is normally conducted with the electrolyte held at temperatures in the range of 21 degrees C. (70 degrees F.) to 54 degrees C. (130 degrees F.) and with electrolyte concentrations and voltages which will most effectively form such a coating. The item to be anodized is made the positive electrode, or anode (hence "anodizing"). When direct current is passed through the electrolytic cell, water is decomposed, liberating oxygen at the surface of the item. The oxygen combines with the aluminum to form the coating—a transparent and microscopically porous layer of aluminum oxide. The coating's thickness is determined by the electrical current and the length of time it is applied.

Coloring is an option approached in either of two ways. A process called "integral color" imparts color to the coating as it is being formed in the anodizing bath, which has been modified for that purpose. This process usually produces various bronze colors. The second approach to coloring imparts color to the coating after it is formed and takes advantage of the fact that the freshly anodized coating is porous and therefore capable of absorbing colorants. The two methods for applying the color after anodizing are the electrolytic "two-step" process and the use of dyes (sometimes called impregnated color). Items that are not colored during or after anodizing retain the natural color of the metal.

The micro pores in the freshly anodized coating which allow for coloring must be closed, or sealed, before the anodized item is placed into service. If left unsealed, the coating might absorb unwanted stains later on. Unsealed coatings also have poor corrosion resistance. Sealing is accomplished by soaking the work in a hot solution of water and metal salts and/or in hot water alone.

Figure 2:
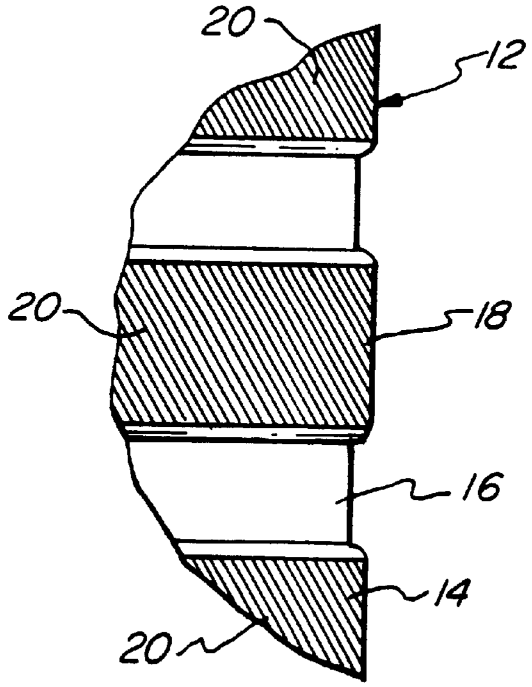
FIG. 2 is a detail view of a portion of the cosmetic case of FIG. 1.

The present invention relates to a method for manufacturing a cosmetic case 10 such as a lipstick dispenser cap 12 with contrasting bright and textured surfaces. The cosmetic case 10 is fabricated from an aluminum alloy by metal processing techniques such as drawing and stamping in a metal forming machine. In the case of a lipstick dispenser cap, the aluminum alloy will be in the form of tube stock and will be formed in a die into the desired shape of the lipstick dispenser cap 12. In the embodiment shown in FIGS. 1–2, the lipstick dispenser cap 12 is formed in a die in a metal forming machine to have an outer surface 14. The cap outer surface 14 is formed with alternating channels 16 and bands 18. The cap diameter of the bands 18 is greater than the cap diameter at the channels 16.

A surface texture 20 is applied to portions of the cosmetic case 10 to form textured portions. The surface texture 20 may be applied to the cosmetic case 10 in the metal forming machine simultaneously with the fabrication of the cosmetic case 10 in the metal forming die, or it may be applied in a secondary operation, such as a rolling step in a die, subsequent to the initial fabrication of cosmetic case 10. In the embodiment shown in the drawings, the lipstick dispenser cap 12 is provided with a texture 20 applied to the outer surface of the bands 18. One possible texture 20, as shown in the drawings, is a series of fine ridges applied at a diagonal to the axis of the lipstick dispenser cap 12.

The cosmetic case 10 may then be polished, either by mechanical polishing with a fine polishing compound and/or by a bright dip process as described above; however, depending on the desired appearance of the product, the polishing step may be omitted in some cases. Where the surface texture 20 is applied to the cosmetic case 10 in a secondary operation, the polishing step may be a mechanical polishing step which is part of the secondary operation.

The cosmetic case is then anodized, using a silver tint mixed into the electrolyte, to provide an integral color, in particular, a bright silver shine, which is applied to at least the outer surface of the cosmetic case 10. After sealing and rinsing steps, the final printing step is applied.

The printing step involves printing over the textured portions 20 with an ink to provide the textured portions 20 with a contrasting finish to the bright shine of the other parts of the cosmetic case 10. In the embodiment shown in the drawings, the printing ink is applied to the textured bands 18. The printing ink used is preferably a translucent matte ink. However, other types of fluids, such as dyes or paints could potentially be used in the method of the invention, and the term ink shall include any such liquid having the necessary translucency, and adhesion qualities for application to a textured anodized aluminum. The ink is applied by a roller or rollers and dried.

The finished product has an appearance which is nearly identical to the original silver plated cosmetic cases, but at a lesser cost. The present invention thus provides a method of manufacturing anodized metal cosmetic cases with contrasting bright and textured surfaces.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. A method for manufacture of a cosmetic case, comprising the steps of:

fabricating a cosmetic case from aluminum alloy;

applying a surface texture to outer portions of said cosmetic case to form textured portions thereon;

then anodizing said cosmetic case to provide a bright shine to at least the outer surface of said cosmetic case;

then printing over said textured portions with an ink to provide said textured portions with a contrasting finish to said bright shine of said outer surface of said cosmetic case.

2. A method for manufacture of a cosmetic case in accordance with claim 1 wherein said cosmetic case comprises a cap for a lipstick dispenser.

3. A method for manufacture of a cosmetic case in accordance with claim 2, wherein said cap has an outer surface, and said cap outer surface is provided with smooth channels alternating with textured bands.

4. A method for manufacture of a cosmetic case in accordance with claim 1, wherein said ink is a translucent matte ink.

5. A method for manufacture of a cosmetic case in accordance with claim 1, further comprising the step of polishing said cosmetic case prior to said anodizing step.

6. A method for manufacture of a cosmetic case in accordance with claim 5, wherein said polishing step comprises pretreating said cosmetic cases in a bright dip solution prior to said anodizing step.

7. A method for manufacture of a cosmetic case in accordance with claim 5, wherein said polishing step comprises mechanically polishing said cosmetic cases prior to said anodizing step.

8. A method for manufacture of a cosmetic case in accordance with claim 1, wherein said step of applying a surface texture to said portions of said cosmetic case occurs in a metal forming machine simultaneously with said step of fabricating said cosmetic case.

9. A method for manufacture of a cosmetic case in accordance with claim 1, wherein said step of applying a surface texture to said portions of said cosmetic case occurs in secondary operation subsequent to said step of fabricating said cosmetic case.

10. A method for manufacturing a lipstick dispenser cap, comprising the steps of:

fabricating a lipstick dispenser cap from aluminum alloy, said cap having an outer surface, said cap outer surface having at least one channel alternating with bands, said cap outer surface having a diameter, said cap outer surface diameter being greater where said bands are located and said cap outer surface diameter being less where said at least one channel is located;

applying a surface texture to said bands of said cap outer surface to form textured bands;

polishing said cosmetic cases;

then anodizing said cap to provide a bright shine to the outer surfaces of said cap;

then printing over said textured portions with an ink to provide said textured portions with a contrasting finish to said bright shine of said outer surfaces of said cap.

11. A method for manufacturing a lipstick dispenser cap, in accordance with claim 10, wherein said polishing step comprises pretreating said cosmetic cases in a bright dip solution prior to said anodizing step.

12. A method for manufacturing a lipstick dispenser cap in accordance with claim 10, wherein said polishing step comprises mechanically polishing said cosmetic cases prior to said anodizing step.

13. A method for manufacturing a lipstick dispenser cap in accordance with claim 10, wherein said step of applying a surface texture to said portions of said cosmetic case occurs in a metal forming machine simultaneously with said step of fabricating said cosmetic case.

14. A method for manufacturing a lipstick dispenser cap in accordance with claim 10, wherein said step of applying a surface texture to said portions of said cosmetic case occurs in a secondary operation subsequent to said step of fabricating said cosmetic case.

15. A method for manufacturing a lipstick dispenser cap, in accordance with claim 10, wherein said ink is a translucent matte ink.

16. A method for manufacturing a lipstick dispenser cap, comprising the steps of:

fabricating a lipstick dispenser cap from aluminum alloy, said cap having an outer surface, said cap outer surface having at least one channel alternating with bands, said cap outer surface having a diameter, said cap outer surface diameter being greater where said bands are located and said cap outer surface diameter being less where said at least one channel is located;

applying a surface texture to said bands of said cap outer surface to form textured bands;

then anodizing said cap to provide a bright shine to the outer surfaces of said cap;

then printing over said textured portions with an ink to provide said textured portions with a contrasting finish to said bright shine of said outer surfaces of said cap.

17. A method for manufacturing a lipstick dispenser cap, in accordance with claim 16, further comprising a polishing step performed prior to said anodizing step, said polishing step consisting of one or more of pretreating said cosmetic cases in a bright dip solution or mechanically polishing said cosmetic cases.

18. A method for manufacturing a lipstick dispenser cap in accordance with claim 17, wherein said step of applying a surface texture to said portions of said cosmetic case occurs in a metal forming machine simultaneously with said step of fabricating said cosmetic case.

19. A method for manufacturing a lipstick dispenser cap in accordance with claim 17, wherein said step of applying a surface texture to said portions of said cosmetic case occurs in a secondary operation subsequent to said step of fabricating said cosmetic case.

* * * * *